Patented July 11, 1944

2,353,442

UNITED STATES PATENT OFFICE 2,353,442

COMPOSITION TOXIC TO LOWER FORMS OF LIFE

Edward C. Callaway and Robert G. Rosenstiel, Corvallis, Oreg.

No Drawing. Application January 17, 1941, Serial No. 374,892

3 Claims. (Cl. 167—33)

This invention relates to compositions toxic to lower forms of life, more particularly to compositions comprising organic compounds containing in their molecule the alkyl radical isoamyl linked to nitrogen in certain nitrogenous organic compounds.

An object of this invention is to provide an improved material or composition which is relatively non-toxic to man and to domestic animals when taken by the mouth, and which may be used in place of lead arsenate and other arsenicals in controlling insects that infest and injure crops.

A further object of the invention is to provide an improved material or composition suitable for use as an insecticide, and as an insect repellant. It is also an object of the invention to provide a material suitable for use as an ovicide and larvicide when applied to the eggs and larvae of insects.

It is a further and important object of this invention to provide a material or composition which will not only have a high insecticidal value when applied to farm crops, but which will also have a fertilizer value. For example, when farm crops are sprayed year after year with a poisonous material such as one of the arsenicals, the cumulative deposition thereof eventually causes contamination of the soil, whereas in accord with this invention the cumulative deposition of the composition within the scope of this invention has a definite fertilizing value which enriches instead of contaminating the soil. This is accomplished by changing nitrogenous compounds of well-known fertilizer value in such a manner as to impart to them the property of being highly toxic to insects without destroying their known fertilizing value.

Compounds well known as concentrated nitrogen fertilizers, by way of example, include urea, uric acid in guano, guanidines, cyanamides, and, of course, other amido and imido compounds which decompose in the soil to form nitrates, nitrites and ammonia salts.

In carrying out our invention we have found that the isoamyl radical develops an unexpected and strong toxicity when linked to a nitrogen that in turn is linked to carbon atoms of certain other aliphatic or aromatic structures. Our study and research reveals that the toxicity for insects and lower forms of life does not reside in the isoamyl radical as such, or in the C—N linkage of other organic radicals that may be linked with nitrogen, but rather in the peculiar electron arrangements that take place when isoamyl is linked to nitrogen in certain structures, where all of the bonds of trivalent nitrogen are held by carbons one of which is an integral part of an organic structure other than alkyl. For example, if the nitrogen is an imido group linked to two ring structures such as diphenylamine or dicyclohexylamine, the toxicity develops when the N-hydrogen is replaced by isoamyl. Similarly, when the nitrogen is included in a heterocyclic ring as in piperidine, pyrrole, and hexahydro-nicotine the toxicity develops when the N-hydrogen is replaced by isoamyl. Also, when the nitrogen is an amido group linked to a carbon in a aliphatic linkage other than a normal alkyl group or in an aromatic linkage, the highest toxicity develops when both the N-hydrogens are replaced by isoamyl.

From the foregoing it will be apparent that there are many organic compounds which fall within the scope of the present invention, all of which develop the high toxicity above referred to and many of which have high fertilizer value, in contrast to the contamination incident to the use of many of the insecticides of the prior art.

We have found that two isoamyl radicals substituted for the hydrogens of aniline viz, diisoamyl aniline, increases the toxicity so only one-half the amount of diisoamyl aniline would be required to produce a 50% kill of 12-spotted cucumber beetle as against the amount of isoamyl aniline required for the same percentage kill.

While triamyl amine in common with some other trialkyl amines possess toxicity for insects, we have found that the trialkyl amines are not very practical as insecticides because of instability and because of their putrid and very offensive odors. We have found mixed amines such as diphenyl isoamyl-amine and di-cyclohexyl-isoamyl amine are more efficient as insecticides than the trialkylamines in that they are more stable, more toxic, more compatible in that they are nearer neutral, and are less offensive to those who must use them.

In the specification and claims we have used the term "isoamyl" to include the following structures:

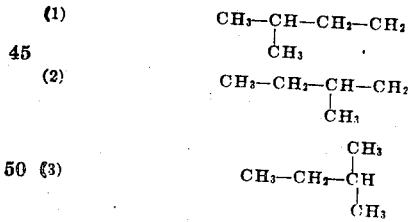

But the preferred form of our invention includes the isoamyl radical, also known as 2 methylbutyl, having the structure:

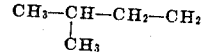

The compositions toxic to lower forms of life which come within the scope of this invention may be represented by the formula:

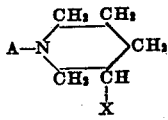

Where A is the alkyl-radical isoamyl, and X is a hydrogen - saturated carbon - nitrogen ring structure such as piperidine, or pyrollidine. The peculiar toxicity of this invention is manifest only when X is substituted on the 2nd or beta carbon from the nitrogen, and when isoamyl is on the nitrogen. Specific examples of this toxic linkage are N-isoamyl-hexahydro-nicotine, N-isoamyl - hexahydro - anabasine, N-N-diisoamyl-hexahydro - anabasine, N-N-diisoamyl-hexahydro-nor-nicotine.

In the foregoing and in the claims the use of the nomenclature "N-isoamyl" of "N-diisoamyl" indicates that the isoamyl radical is substituted on the nitrogen rather than on the carbon of a ring structure or an aliphatic structure.

The following structural formulas indicate some of the typical structures of these new insecticides.

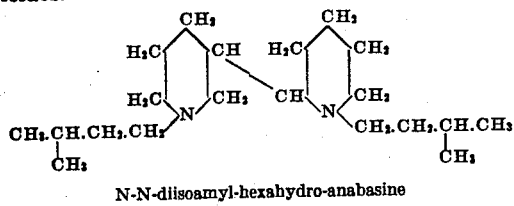

N-N-diisoamyl-hexahydro-anabasine

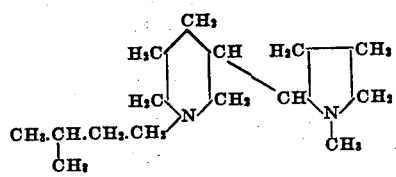

N-Isoamyl-hexahydro-nicotine

The foregoing examples are not to be taken as limitative upon the scope of the invention but as representative only, since those skilled in the art will understand that many additional compounds will fall under the definition including many of the hundreds of compounds which we have tested, and which developed the toxicity that in part characterizes our invention.

With the foregoing teachings in mind as to the nature of the compounds to be produced, compounds of the designated characteristics may be made in manner well-known to those skilled in the art. For example, compounds within the scope of the invention may be made by reacting isoamyl-halides with aliphatic, aromatic or alicyclic amides or imides in the presence of a mild base such as sodium carbonate in a mixture of suitable solvents.

If it is desired to make N-isoamyl-hexahydro-nicotine, the nicotine is first hydrogenated, preferably, by an electrolytic process at a low temperature. Then one mol of hexahydro-nicotine, one mol of isoamyliodide, and one and one fourth mols of potassium hydroxide are dissolved in 1000 cc. of 95% alcohol, refluxed for 8 hours, then alcohol distilled off down to 200 cc., then 400 cc. of water added and the isoamyl-hexahydro-nicotine is extracted with ether, the ether distilled off under vacuum and the product purified by vacuum distillation.

It is to be understood the method of manufacturing or compounding these materials may be varied, and it is to be further understood the particular method used to make these materials or compounds does not affect the toxicity and fertilizer values.

For specific examples of the toxicity of these compounds there are listed below the results of selected tests where insects were treated by the dip method for ten seconds with a solution or colloidal suspension of the organic compound in the presence of a soluble casein spreader.

For the purpose of demonstrating the comparative toxicity of these novel insecticides with the parent compounds from which they are made, the following table indicates the summary of insect toxicity tests where a common standardized technic was used applying the chemical in various dilutions to a common insect under controlled conditions. In each instance the dilution of the parent substance required to kill 50% of the standard insects is stated and followed by the dilution of the isoamyl compound which produces a 50% kill.

| Chemical | Insect | No. insects used | Dilution producing 50% kill |
|---|---|---|---|
| | | | Percent |
| Nicotine | Confused flour beetle | 50 | 3.0-5.0 |
| N-isoamyl-hexahydro-nicotine | do | 80 | 0.2-0.25 |
| Nicotine | 12 spotted cucumber beetle | 420 | 1.0-2.0 |
| N-isoamyl-hexahydro-nicotine | do | 430 | 0.4-0.6 |
| Anabasine | Confused flour beetle | 100 | 5.0-(20% kill) |
| N-N-diisoamyl-hexahydro-anabasine | do | 100 | 0.4-0.6 |

Check tests on casein spreader on 1100 insects gave only 1.7% kill with confused flour beetle and 0.8% with the 12 spotted cucumber beetle.

The above examples serve to illustrate how the substitution of one or two isoamyl radicals for hydrogens on a nitrogen linked up to a carbon in other organic ring or aliphatic structures greatly increases the toxicity of the organic structure toward insects and reduces the dosage required to kill insects. In comparison with such standard insecticides as nicotine, these isoamyl compounds are found to be more efficient in killing certain insects which appear to be immune to the toxic effect of nicotine such as beetles and weevils, for example the 12-spotted cucumber beetle, the confused flour beetle, the potato flea beetle, the bean weevil and the like. Thus nicotine and other compounds of pyridine, naphthalene, benzene, and its derivatives, cyclo-hexane and its derivatives are rendered more toxic to a wide variety of insects in that very much lower concentrations are required to kill the insects. Many of these isoamyl compounds are insect repellents, larvacides, and ovicides.

The examples cited to indicate the relative toxicity of these compounds are not to be construed as limiting either the method of application or the kind of insects to which they may be applied, or of the results which may be obtained by the use of other compounds of this novel composition.

These compounds may be applied in the form of dusts, solutions or suspensions in various media, with or without the use of spreading or wetting agents, or by any other method generally used for the application of insecticides. In preparing dusts for field application from these novel insecticides the material is atomized or sprayed in a fine mist onto such powders as diatomaceous earth or walnut shell powder in the desired concentration. As sprays these new insecticides are incorporated with the usual wetting and spreading agents such as alkaline-casein, sulfonated oils, or the various commercial wetting and spreading agents.

In the practical application of these novel spray materials the usual field spray formulas for soluble and insoluble organic compounds are applicable. For instance, with soluble compounds such as isoamyl-hexahydro-nicotine one pint of the 40 percent sulfate is added to 100 gallons of water containing one pound of casein spreader. The compounds insoluble in water may be suspended in water by the recommended amount of commercial wetting agent such as soaps, sulfonated oils, or triethanolamine-oleate using one to four pounds of the new insecticide per hundred gallons and applying in the usual way by the use of spray machinery.

As many apparently widely different embodiments of this invention may be made without departing from the spirit and scope thereof, it is to be understood that we do not limit ourselves to the specific embodiments thereof except as defined in the appended claims.

What we claim is:

1. An insecticidal composition containing as its active toxic ingredient a compound of the structure of N-isoamyl-hexahydro-nicotine.

2. An insecticidal composition containing as its active toxic ingredient a compound of the structure of N-N-diisoamyl-hexahydro-anabasine, and a carrier for said ingredient.

3. An insecticidal composition containing an active ingredient which comprises a tertiary amine of the general type formula:

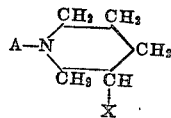

wherein A is the alkyl radical isoamyl, and X is a hydrogen saturated carbon-nitrogen ring structure, and a carrier for said ingredient.

EDWARD C. CALLAWAY.
ROBERT G. ROSENSTIEL.